United States Patent [19]

Blaisdell et al.

[11] 4,384,319
[45] May 17, 1983

[54] PROJECTION LIGHTING UNIT WITH REAR LOADING LAMP CAPSULE MEMBER

[75] Inventors: Ronald G. Blaisdell, Saugus; Harold L. Hough, Beverly; C. Edward Kowalski, Marblehead, all of Mass.

[73] Assignee: GTE Products Corporation, Stamford, Conn.

[21] Appl. No.: 217,627

[22] Filed: Dec. 18, 1980

[51] Int. Cl.³ ............................................. F21V 7/00
[52] U.S. Cl. ..................................... 362/296; 362/16; 362/306; 362/341; 362/350; 362/457
[58] Field of Search ................. 362/16, 296, 306, 341, 362/350, 457

[56] References Cited

U.S. PATENT DOCUMENTS 3,852,583 12/1974 Puyplat ............................ 362/296
4,156,901 5/1979 Haraden ........................... 362/296

Primary Examiner—Donald P. Walsh
Attorney, Agent, or Firm—Lawrence R. Fraley

[57] ABSTRACT

A projection lighting unit which includes a U-shaped bracket member having an apertured faceplate and a rear upstanding wall, a glass reflector secured to the bracket's faceplate portion and including a concave reflecting portion and a rear neck portion adjacent thereto and including a cylindrical opening therein, a capsule member removably positioned within the reflector's rear opening and including an incandescent projection lamp (e.g., tungsten-halogen) and a cylindrical, metallic base member secured to the sealed end of the lamp, and a biasing flange member including a pair of cam springs which slidably engage the upstanding rear wall of the bracket during rotational insertion of the lamp capsule within the unit's reflector. The unit thus provides for rear removal of the lamp capsule from the glass reflector and bracket components. A separate socket member capable of being attached to the rear of the capsule to effect contact with a pair of contact pins projecting therefrom may also constitute part of the unit.

11 Claims, 4 Drawing Figures

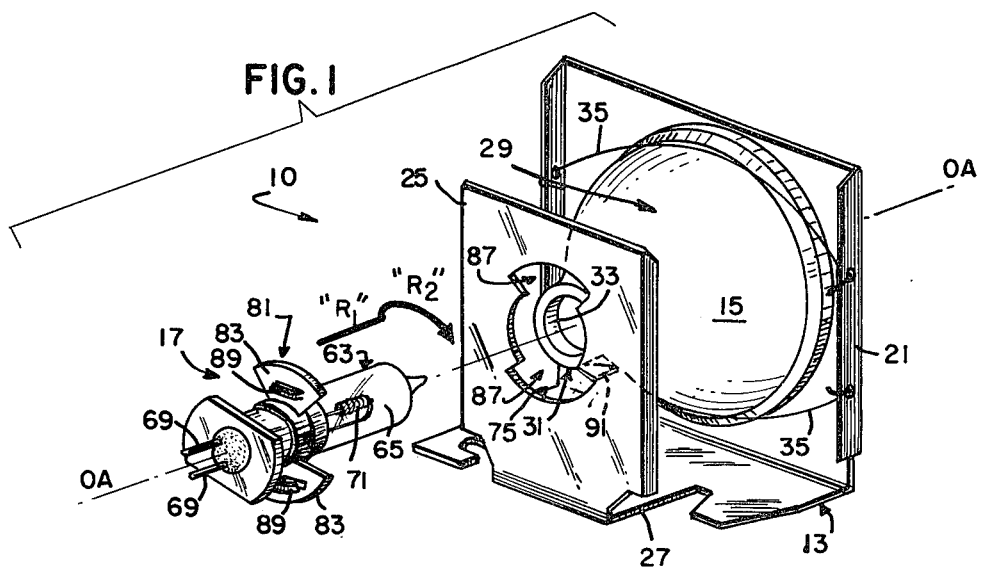
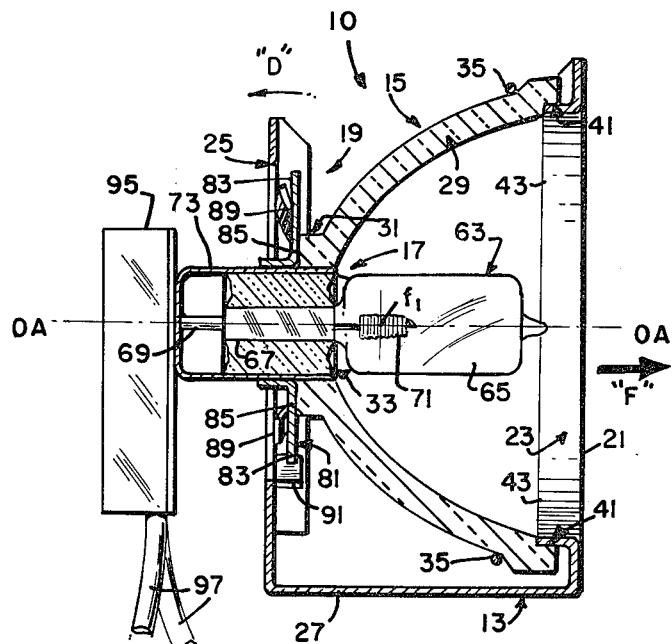

PROJECTION LIGHTING UNIT WITH REAR LOADING LAMP CAPSULE MEMBER

DESCRIPTION

1. Technical Field

The invention relates to projection lighting units and particularly to such units which include an incandescent lamp, glass reflector, and lamp holder (or bracket) components as part thereof. Such units are typically utilized in microfilm, slide and movie (e.g., 16 mm) projectors.

2. Background

In many projection units which include a preformed glass reflector and projection lamp (e.g., tungsten halogen) therein, the lamp is retained in alignment within the reflector by employing a suitable cement (e.g., sauereisen) within the reflector and about the lamp's sealed end. Examples of such arrangements are shown in U.S. Pat. Nos. 3,314,331 (Wiley) and 3,639,750 (Anthonijsz). Use of cement of a similar permanent-type bonding agent prohibits separation of the lamp and reflector in the event that replacement of either of these components is necessary. In almost all cases, it is only the incandescent lamp which fails and needs replacement. The aforementioned permanent bond between lamp and glass reflector was believed essential to assure precise alignment between said components and between these members and other elements (e.g., film gate, projection lens) within the overall system. Alignment between reflector and lamp was usually achieved using a precisioned instrument whereupon the assembled unit was ready for insertion within a respective socket-bracket (or holder) component, such as shown in U.S. Pat. No. 3,789,212 (Wagner). This latter positioning was usually accomplished by the projector's operator.

Mandatory replacement of both lamp and glass reflector has therefore resulted in unnecessary waste of material which in turn has added appreciably to the overall cost of operating such systems.

The projection unit in U.S. Pat. No. 4,156,901 (Haraden et al), assigned to the assignee of the instant invention, was designed to eliminate the above undesired requirement by providing a retention member which is removable from within the reflector yet which also assures positive alignment of the unit's incandescent lamp with the reflector when said lamp is positioned therein. The retention member is secured to the lamp's sealed end and may comprise a metallic "can", a preformed component of insulative material such as ceramic, or a combination of both. While the unit of U.S. Pat. No. 4,156,901 readily assures alignment of the lamp and retention member within the glass reflector, as well as facile rearward removal therefrom, this unit requires a relatively large rear opening in the reflector's neck portion to accommodate the retention member and its several projecting segments. In addition, the unit of U.S. Pat. No. 4,156,901 requires utilization of several slots (or grooves) within the glass reflector, thus adding to the costs of manufacturing this component. It is understood that the requirement of a relatively large internal opening in the reflector's neck serves to reduce the overall available reflective surface of the reflector, thus lowering the unit's efficiency.

The unit described in U.S. Pat. No. 4,219,870 (Haraden et al), also assigned to the assignee of this invention, was designed as an improvement over the rear loading unit of U.S. Pat. No. 4,156,901 and provided forward (front) lamp removal. A removable retention member is used in the unit of U.S. Pat. No. 4,219,870 to slidably engage rear protruding portions of the lamp capsule to hold it in place within the unit's glass reflector. Use of slots within the glass reflector are still required but the inventors of this device were able to significantly reduce the size of the rear opening and thus increase efficiency. It was only possible, however, to remove the lamp capsule in the forward direction.

Accordingly, the present invention represents an improvement over the projection units described above by providing a unit which permits rear loading and removal of the unit's lamp capsule from within a glass reflector which in turn does not require internal slots or grooves and which possesses an opening only slightly larger than the capsule itself. In addition, the invention provides a unique way of aligning the lamp capsule's envelope (and internal filament structure) within the glass reflector's concave reflecting portions in such a manner that similar, additional units can be readily substituted therefore with said alignment always being assured. The need for replacing the glass reflector in the event that only the lamp fails is thus eliminated while still maintaining the above features. Even further, the invention provides a new and unique means whereby the glass reflector can be more accurately aligned within the unit's bracket (or holder) component.

It is believed therefore that a projection lighting unit possessing the above unique features would constitute a significant advancement in the art.

DISCLOSURE OF THE INVENTION

It is a primary object of this invention to enhance the projection lighting unit art by providing a unit possessing the advantageous features described above.

In accordance with one aspect of the invention, there is provided a projection lighting unit which comprises a bracket member having an apertured faceplate portion and a rear upstanding portion, a glass reflector with a concave reflecting portion and rear neck portion adjacent thereto, said rear portion having an opening therein, a lamp capsule member which is removably positioned from within the rear opening of the glass reflector and including an incandescent projection lamp and a base member secured to the sealed end of the lamp, and biasing means located on the capsule's base portion for engaging the bracket's upstanding rear portion to continuously bias the lamp capsule toward the faceplate portion of the bracket member such that the envelope portion of the lamp capsule will be aligned within the reflector's concave portion in a predetermined manner and maintained in said alignment when the lamp capsule is located within the reflector's rear opening.

BRIEF DESCRIPTION OF THE DRAWINGS

FIG. 1 is an exploded isometric view of a projection lighting unit in accordance with a preferred embodiment of the invention;

FIG. 2 is an enlarged, side elevational view of the unit of FIG. 1 as assembled;

BEST MODE FOR CARRYING OUT THE INVENTION

Figure 3:
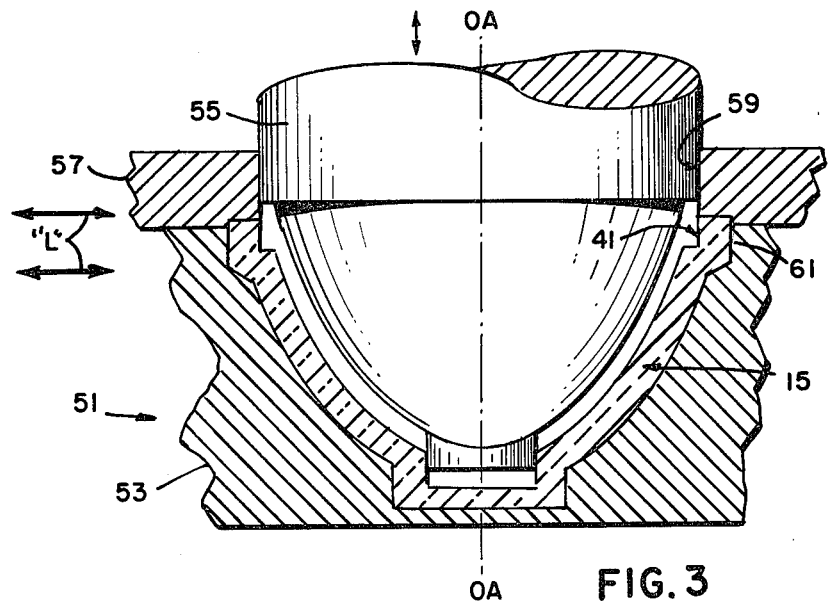
FIG. 3 illustrates various components of the lampmaking equipment utilized to produce the glass reflector of the invention.

For a better understanding of the present invention together with other and further objects, advantages and capabilities thereof, reference is made to the following disclosure and appended claims in connection with the above-described drawing.

In FIGS. 1 and 2, there is shown a projection lighting unit 10 in accordance with one embodiment of the invention. Unit 10 comprises a U-shaped bracket member 13, a glass reflector 15, a lamp capsule member 17 which is removably positioned within reflector 15, and biasing means 19 for biasing capsule 17 toward the forward or front portion of bracket 13 (and therefore reflector 15) and maintaining the capsule in alignment within the reflector 15 when the capsule is located therein.

Bracket member 13 includes an upstanding face plate portion 21 having a large aperture 23 therein through which the projected light from unit 10 will pass. Bracket member 13 further includes a rear upstanding portion 25 which is substantially parallel to face plate portion 21 and joined thereto by a common base portion 27, thus forming a U-shaped component. Bracket 13 is preferably metallic (e.g., 20 ga. steel) and, as will be described, is also somewhat resilient in that it permits flexure of the rear portion 25 during capsule insertion.

Reflector 15 includes a concave reflecting portion 29 and a hollow rear neck (or collar) portion 31 immediately adjacent thereto. Neck portion 31 includes a cylindrical opening 33 therein designed to accommodate capsule 17. As illustrated in FIG. 2, the central axis of opening 33 coincides with the optical axis OA—OA of reflector 15. It is also preferred in this regard that the aperture 23 of faceplate portion 21 be substantially cylindrical and have its central axis also coincide with optical axis OA—OA. The interior of concave reflecting portion 29 is preferably elipsoidal or parabolic and includes a thin dichoric internal layer or coating therethrough while still directing the lamp's visible light output in the forward direction "F" as shown in FIG. 2. Reflector 15, as stated, is of glass material and preferably of a hard glass (e.g., borosilicate). As clearly shown in FIGS. 1 and 2, the internal cylindrical opening 33 within rear portion 31 does not include any internal slots or grooves therein. The reflector is held in position in unit 10 against faceplate portion 21 of bracket 13 by a pair of wires 35 (FIG. 1) which are secured at opposing flange portions of the face plate portion 21 and engage the external surface of concave reflecting portion 29 to form an interference fit and exert a forward force thereagainst. The front of the reflector is thus positively retained against faceplate portion 21 in the preferred manner of alignment described. It is of course understood that alignment of both the reflector and lamp capsule is critical in units of this variety in view of the fact that such units must be precisely aligned with remaining components of the overall projection system, such as the projector's film gate and projection lens, in order to assure optimum output of the system. Accordingly, the lamp capsule must be aligned properly within the reflector and this entire, assembled unit must thereafter be aligned within the overall system.

The instant invention represents a unique concept in assuring proper alignment between the reflector and bracket components in a projection lighting unit by providing a recessed, annular shoulder portion 41 within the front portion of the reflector's concave portion and mating this shoulder with an annular, upstanding flange 43 which extends inwardly from faceplate 21 and also serves to define the forward aperture 23. Preferably, a close fit is provided such that the external diameter of flange 43 is only slightly smaller (e.g., 0.002–0.006 inch) than the internal diameter of the annular shoulder portion 41. The aforedescribed method of alignment is considered unique in the projection unit art to assure that the reflector's focal point "$f_1$" lies on the optical axis OA—OA in the manner illustrated in FIG. 2. Specifically, this arrangement provides a means whereby the bracket can engage a surface of the reflector which is almost always deemed true with regard to the reflector's optical axis. Heretofore, many prior art units engaged or retained the glass reflector by an external or other surface which, as described below, could not be relied upon to provide precisioned alignment in view of a manufacturing problem often encountered during production of such reflectors (see below). With regard to FIG. 3, an example of this is shown. The typical glass reflector 15 is formed within a mold member 51 which in turn includes a female portion 53 designed to have a predetermined quantity of molten glass deposited therein which eventually constitutes the finished product, a plunger 55 which engages the molten glass within the female portion of the mold to define its final internal configuration (the female portion 53 defining the external configuration), and a neck ring portion 57 which mates with the female portion 53 to define the forward surface of the reflector and also to accommodate the plunger 55. In such equipment, it is occasionally possible for misalignment to occur between the neck ring and female portions as a result of lateral movement ("L") thereof during the manufacturing process. Notwithstanding such movement however, the plunger 55, being of substantially cylindrical configuration, maintains precisioned alignment within the corresponding cylindrical aperture 59 of the neck ring portion and thus remains substantially true with regard thereto. It can thus be seen and understood in FIG. 3 that should a shifting or misalignment occur between the female and neck ring portions, the result will be a differential in thickness in the side walls of the formed glass reflector. Accordingly, using an external surface thereof (e.g., flange 61) to align the reflector can prove deleterious in that said surface can be significantly offset with regard to the centrally located optical axis OA—OA. Engagement of an internal surface such as 41 eliminates this adverse possibility.

Lamp capsule member 17 includes an incandescent projection lamp 63 having an envelope portion 65 and a press-sealed end 67 from which project a pair of contact pins or wires 69. Located within envelope 65 is a tungsten filament structure 71 which in turn is electrically connected to the projecting pins 69. Lamp 63 is preferably one of the tungsten-halogen variety capable of producing 200 watts at a potential of 24 volts. Lamps of this type are known in the art and are typically rated for approximately fifty hours of operation. Capsule 17 further includes a metallic base component 73 which is fixedly secured (e.g., using sauereisen cement) to the sealed end 67 of lamp 63. Both the base 73 and envelope 65 are of a substantially cylindrical configuration. As shown in FIG. 2, capsule 17 is oriented within the unit 10 such that the filament 71 coincides with the focal point "$f_1$" of reflector 15 and the cylindrical base is retained within the rear opening 33 of neck portion 31.

The capsule member is removable from unit 10 via the rear portion thereof or, in better terms, through the rear opening 33 and an opening or aperture 75 provided within upstanding portion 25 of bracket 13. The operator of the projection system utilizing the instant invention is thus able to readily remove and replace a defective lamp capsule member in a safe and expeditious manner. As will be understood from the following description, the operator is also able to provide said replacement while still assuring precise alignment of the substitute capsule member within unit 10. This unique and highly desirous mode of cooperation between elements of unit 10 is assured by provision of biasing means 19 which is located on the cylindrical base 73 and adapted for engaging the upstanding rear portion 25 of bracket 13 so as to continuously bias capsule 17 in the forward direction "F" (toward the apertured face plate portion 21) while simultaneously maintaining the afore-defined alignment of lamp 63 within reflector 15. In the embodiment depicted in FIGS. 1 and 2, biasing means 19 comprises an annular flange member 81 which is fixedly secured (e.g., welded) about the external cylindrical surface of base 73. Preferably, the projecting, substantially planar wing portions 83 are each perpendicular to the sides of the cylindrical base and therefore also to the central axis of base 73. Flange 81 is preferably #26 gauge steel and base 73 is preferably #31 gauge steel.

As shown in FIG. 2, the perpendicularly projecting wings of flange 81 engage the flat rear surface 85 above reflector 15 and at the same time slidably engage the interior surface of the upstanding rear portion 25 of bracket 13. Rear 25, as shown in FIG. 1, also includes a corresponding pair of opposed slots 87 therein each for accommodating a respective one of the projecting wings 83 during initial capsule insertion. During said initial insertion ("R₁"), the capsule is fed directly into opening 33 after which it is rotated, preferably clockwise ("R₂"), to effect the aforementioned sliding engagement. During said rotation, a pair of protruding cam spring members 89, each located and extending from a respective wing portion 83 of flange 81, provides the contact with the internal wall or rear portion 25. During this rotation, each of the opposingly positioned cam springs 89 are compressed only slightly and at the same time the rear portion 25 is deflected away ("D"), also only slightly. This type of resilience on the part of both flange 81 and of upstanding rear portion 25 of bracket 31 assures both ease of insertion of capsule 17 and also the described flush engagement by flange 81 with the rear wall 85 of reflector 15. It is thus seen and understood that both flange 81 and the entire capsule assembly 17, including lamp 63, rotate in the described manner during final capsule insertion within unit 10. To determine the extent of said rotational movement, the rear wall portion 25 includes a projecting stop member 91 which engages one of the rotating wing portions 83 along an edge thereof. Stop 91 is preferably a tab or similar element welded to or forming an extension of the back portion 25.

Figure 4:
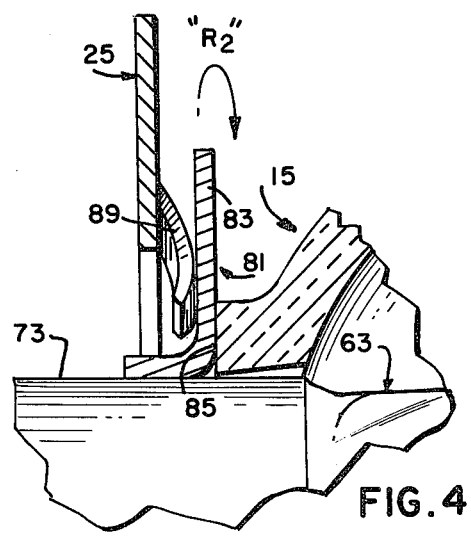
FIG. 4 is an enlarged, partial side elevational view of an alternate embodiment of a biasing means for use in the invention.

In an alternate embodiment to the invention as depicted in FIG. 4, it is within the scope of the invention to position the pair of opposed cam spring members 89 (only one shown) on the substantially planar rear portion 25 of bracket 13 and engage these springs with flat, projecting wing portions 83 of flange 81. As shown in FIG. 4, this arrangement also assures the substantially flush positioning of the planar wing portions 83 against the flat, rear surface 85 of reflector 15.

The described rotational positioning of capsule 17 thus serves to assure precise forward location of the capsule such that its tungsten filament 71 will lie coincidental to the focal point "f₁" of reflector 15. It is also shown in FIG. 2 that because the rear opening 33 of reflector 15 is only slightly larger than the external diameter of cylindrical base 73, the capsule is positioned such that vertical movement of the lamps envelope 65 within reflector 15 is substantially prohibited. In a preferred embodiment of the invention, the external diameter of cylindrical base 73 was about 0.460 inch whereas the internal diameter of opening 33 was only 0.470 inch. Likewise, opening 33 is only slightly larger than the external diameter of envelope 65 of lamp 63 to thus assure a minimum loss of reflective surface for the reflector while still assuring the described unique positioning of the completed capsule.

In addition to the above components, unit 10 may also include a socket member 95 which serves to effect contact with the projecting contact pins 69 from capsule 17 and can be readily removed therefrom. Socket 95 is thus an entirely separate component and need not be affixed or otherwise secured to the rear portion or wall 25 of bracket 13 as is typically required in many prior art projection lighting units. A pair of electrical wires 97 extend from the bottom of socket 95 and may be connected to the power source associated with the projection system using the invention. The housing portion of socket 95 is preferably of ceramic construction and includes the necessary contacting elements (not shown) therein for providing contact with each of the pins 69. There is thus been shown and described a new and unique projection lighting unit which permits rear loading of the lamp capsule component to thus eliminate the need for replacement of both capsule and reflector. The invention as described also provides a new and unique means for aligning the glass reflector with the metal bracket component and also assures that substitution of additional capsule components of similar construction can be readily made in a safe and expeditious manner while maintaining the critical, precisioned alignment essential between such components and the receiving unit. More specifically, each capsule member to be used in unit 10 is preferably placed in an optical fixture and photometrically optimized to a standard reflector, said reflector identical in configuration to that shown for the instant invention. At this time, the formed metal flange 81 is slipped onto the projecting end of base 73 and forced against the rear face or surface of the standard reflector to align it with the optical center line and focal point of both filament and reflector. The flange is then welded to the base can and the assembled capsule removed from the fixture. In this manner, all capsule members are thus prefocused prior to insertion within the reflector 15 to even further assure the described precisioned positioning relationship therewith.

While there have been shown and described what are at present considered the preferred embodiments of the invention, it will be obvious to those skilled in the art that various changes and modifications may be made therein without departing from the scope of the invention as defined by the appended claims.

We claim:

1. In combination, a projection lighting unit comprising:

a bracket member including an apertured faceplate portion and a rear upstanding portion, said faceplate portion including at least one upstanding member located relative to the aperture within said faceplate portion;

a glass reflector having a concave reflecting portion including an internal surface therein located in fixed relationship to the optical axis of said reflector, and a rear neck portion positioned adjacent said reflecting portion and having an opening therein, said upstanding member of said faceplate portion engaging said internal surface of said glass reflector in a close fit relationship to align said reflector with said aperture within said faceplate portion, said optical axis of said reflector passing through the central axis of said opening within said rear neck portion of said reflector and the central axis of said aperture within said faceplate portion of said bracket member, the focal point of said reflecting portion of said reflector lying along said optical axis;

a lamp capsule member removably positioned within said opening of said rear neck portion of said glass reflector for being removed through said rear neck portion, said lamp capsule member including an incandescent projection lamp having an envelope portion and a sealed end portion adjacent said envelope portion, said envelope portion having a filament structure therein, and a base component fixedly secured to said sealed end portion of said lamp; and biasing means positioned on said base portion of said removable lamp capsule member for engaging said rear upstanding portion of said bracket member to continuously bias said lamp capsule member toward said faceplate portion of said bracket member whereby said envelope portion of said lamp capsule member will be aligned within said concave reflecting portion of said glass reflector in a predetermined number of alignment such that said filament will be located along said optical axis of said reflector and will coincide with said focal point when said removable lamp capsule member is positioned within said opening of said rear neck portion of said glass reflector.

2. The projection lighting unit according to claim 1 wherein said bracket member is resilient such that said rear upstanding portion is capable of being deflected away relative to said apertured faceplate portion during said positioning of said lamp capsule member, said biasing means further engaging a surface of said rear neck portion of said glass reflector during said positioning of said lamp capsule member to cause said rear upstanding portion of said bracket member to be so deflected.

3. The projection lighting unit according to claim 2 wherein said biasing means comprises a flange member fixedly secured about said base component of said lamp capsule member, said lamp capsule member and said flange member being rotated during positioning of said capsule member within said opening of said reflector.

4. The projection lighting unit according to claim 3 wherein said flange member includes a pair of opposed resilient cam spring members, said cam spring members slidable engaging said rear upstanding portion of said bracket member during said rotation of said lamp capsule member within said opening of said reflector to cause said flange member to lie substantially flush against said surface of said rear neck portion of said reflector.

5. The projection lighting unit according to claim 3 wherein said rear upstanding portion of said bracket member includes a pair of opposed resilient cam spring members, said flange member slidably engaging said cam spring members during said rotation of said lamp capsule member within said opening of said reflector to cause said flange member to lie substantially flush against said surface of said rear neck portion of said reflector.

6. The projection lighting unit according to claim 3 wherein said rear upstanding portion of said bracket member includes stop means thereon for engaging said flange member during said rotation thereof to prevent further rotation.

7. The projection lighting unit accordingly to claim 1 wherein said rear upstanding portion of said bracket member includes an aperture therein, said envelope portion of said projection lamp of said lamp capsule member being inserted through said aperture within rear upstanding portion of said bracket member prior to said positioning within said glass reflector.

8. The projection lighting unit according to claim 1 wherein said upstanding member located on said faceplate portion of said bracket member comprises an annular flange member located substantially about said aperture within said faceplate portion and said internal surface within said concave reflecting portion of said glass reflector comprises a recessed, annular shoulder, said annular flange being located within and engaging said recessed, annular shoulder in said close fit relationship.

9. The projection lighting unit according to claim 8 further including a pair of wire members each for engaging an opposing external surface of said concave reflecting portion of said reflector to maintain said glass reflector against said faceplate portion of said bracket member.

10. The projection lighting unit according to claim 1 wherein said envelope portion of said projection lamp and said opening within said rear neck portion of said glass reflector are substantially cylindrical in configuration, the diameter of said opening being only slightly larger than the diameter of said envelope portion.

11. The projection lighting unit according to claim 1 wherein said lamp capsule member includes a pair of contact pins projecting therefrom, said unit further including a socket member having said contact pins located therein.

* * * * *